Figure 2:
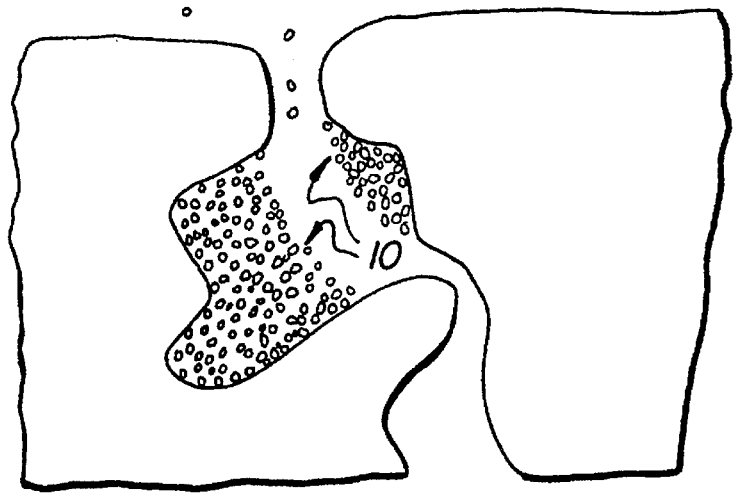

United States Patent [19]
Tallentire et al.

[11] Patent Number: 5,496,629
[45] Date of Patent: Mar. 5, 1996

[54] MODIFICATION OF POROUS MATERIALS

[75] Inventors: Alan Tallentire, Wilmslow; Colin S. Sinclair, Manchester, both of Great Britain

[73] Assignee: The Victoria University of Manchester, Manchester, Great Britain

[21] Appl. No.: 343,447
[22] PCT Filed: May 28, 1993
[86] PCT No.: PCT/GB93/01118
§ 371 Date: Mar. 15, 1995
§ 102(e) Date: Mar. 15, 1995
[87] PCT Pub. No.: WO93/24705
PCT Pub. Date: Dec. 9, 1993

[30] Foreign Application Priority Data

May 29, 1992 [GB] United Kingdom .................... 9211378

[51] Int. Cl.$^6$ ..................................................... B32B 3/26
[52] U.S. Cl. ...................... 428/304.4; 427/244; 427/369; 428/308.8; 428/319.3; 428/319.7
[58] Field of Search ..................................... 427/244, 369; 428/304.4, 308.8, 319.3, 319.7

[56] References Cited

U.S. PATENT DOCUMENTS

| 4,551,191 | 11/1985 | Kock et al. | 427/108 X |
| 5,004,645 | 4/1991 | Tallentire et al. | 428/323 |
| 5,281,437 | 1/1994 | Singh | 427/202 X |

FOREIGN PATENT DOCUMENTS 272798  6/1988  European Pat. Off. .

Primary Examiner—Michael Lusignan
Attorney, Agent, or Firm—Larson and Taylor

[57] ABSTRACT

A method of treating a porous material comprising establishing a pressure differential across the material and treating the higher pressure side with a suspension dispersion or aerosol of droplets of a liquid. The droplets enter at least some of the pores, with the treatment conditions being such that the aerodynamic forces within the pores exceed the surface tension forces maintaining the integrity of the droplets. The droplets thus spread to provide a surface coating within the pores.

32 Claims, 2 Drawing Sheets

VACUUM

FLOW CONTROL SYSTEM — 3

— 2

WEB SAMPLE

1

NEBULIZER SYSTEM — 4

— 5

AIR SUPPLY

*Fig. 1*

MODIFICATION OF POROUS MATERIALS

TECHNICAL FIELD

The present invention relates to a method of treating a porous material to modify a property thereof.

BACKGROUND ART

For certain applications, porous materials (e.g. paper) must be treated so as to impart a desired property thereto. For example, if the porous material is required to resist the penetration of liquids then a suitable coating or dipping treatment of the material may be required. Such dipping or coating treatments may also be required if it is desired to increase fire resistance or enhance strength of the material. Generally however such treatments require a relatively large amount of the treatment agent which might result in undesirable modification of other properties of the material (e.g. its air permeance).

A treatment which does not involve dipping or coating, and which is effected to improve the barrier performance of a porous material is disclosed in EP-A-0,272,798. In this process, a porous material is treated by applying a small pressure differential across the material, and treating the higher pressure side with a suspension, dispersion or aerosol of the pore modifying agent. As a result, the particulate pore modifying agent passes into the larger pores and is retained there to provide zones of high surface area which restrict the passage of micro-organisms through the material, thereby improving performance.

DISCLOSURE OF INVENTION

According to the present invention there is provided a method of treating a porous material comprising establishing a pressure differential across the material and treating the higher pressure side with a suspension, dispersion or aerosol of droplets of a liquid so that said droplets enter at least some of the pores; and wherein the treatment conditions are such that the aerodynamic forces within the pores exceed the surface tension forces maintaining integrity of the droplets which therefore spread to provide a surface coating within the pores. Note: by referring to 'droplets of liquid' it is merely implied that the drops are of flowable and/or spreadable consistency. They may comprise liquid and/or semi-solid components, and may include solids in solution or in suspension.

In operation of the method, the flow of air (or other gas) through the material which is generated by the pressure differential causes the liquid droplets to enter the pores of the material just as the pore modifying agent enters the pores in the process described in EP-A0,272,798). Within a pore, the liquid droplets are (it is believed) retained on the pore surface by Van der Waal's forces. However, the conditions under which the method is operated are such that the aerodynamic forces generated within the pores by the gas flow overcome the surface tension which would otherwise cause the liquid to remain as droplets and thereby cause a "spreading" of the droplets on the pore surfaces to form the coating.

The method of the invention therefore results in a coating of the liquid being provided on the surfaces of the pores within the material. This coating will be of a high surface area (since the internal porous surfaces of the material will provide a high surface area on which the coating may be formed). The coating may be of extremely low thickness, e.g. of the order of a few molecules thick. As such, there is no substantial effect on the air permeance of the material (typically a decrease of less than 50% and preferably less than 201 % as measured in Bendtsen units).

The method of EP-A-0,272,798 is dedicated to producing deposits of particles which retain their particulate nature, so as to provide greatly increased surface area. Therefore the pore modifying agents used consist largely of solids, and they are deposited in the pores under gentle conditions, e.g. relying on Brownian motion capture. Thus the process of EP-A-0,272,798 provides a significant enhancement in barrier performance of this material. In contrast, the method of the present invention results in a coating on the pore surfaces and there is generally no improvement in barrier performance. In fact, treating a porous material by the present method may impair its barrier performance. The present invention requires the use of pore modifying agents in the form of particles which are 'flowable' or 'spreadable', and the use of vigorous conditions such that they are caused to 'flow' or 'spread'. They do not retain their particulate nature, but form coatings.

Figure 3:
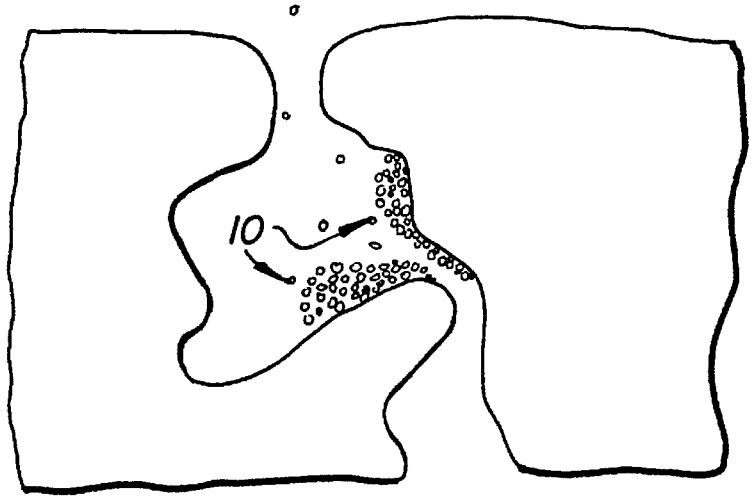

FIGS. 2 and 3 are based on FIGS. 5a and 5b of EP-A-0, 272,798 and show cross sections through barrier material in the region of a pore. FIG. 2 shows 'low inertia' treatment (treatment with a very low pressure differential), in which Brownian motion capture is effective to produce accumulations 10 of particles in chambers of pores. FIG. 3 shows the result of using a somewhat greater pressure differential. Once again there are accumulations 10 of particles, producing zones of high surface area, but these are adjacent constrictions because Brownian motion capture is less important.

Figure 4:
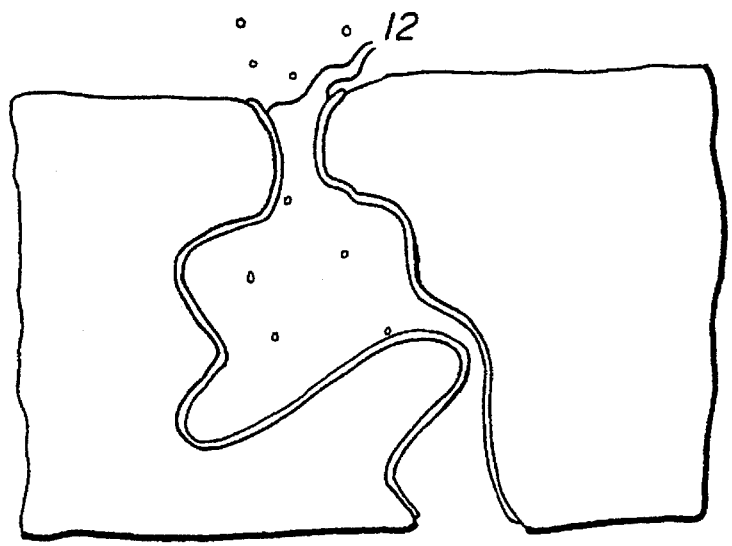

In contrast, FIG. 4 schematically shows treatment according to the present invention. Once again, gas flow carries particles into the pore. The gas flow is too strong for Borwnian motion capture to be significant. Particles impact against the walls of the pore. Furthermore the particles are of 'spreadable' or 'flowable' material. Thus the results of impact and/or the subsequent effects of continuing vigorous gas flow through the pore applying shear forces to material on the walls means that the particles are spread. The result is not an accumulation of substantially discrete particles, but a film 12 coating the wall. It will be appreciated that this makes little difference to the surface area and minimum diameter of the pore. Thus the barrier properties and permeance of the material are little affected.

The aerodynamic forces which are generated within the pores and which are effective to cause the droplets to "spread" into the form of a coating are a function of the type of material being treated (particularly the porosity), the size of the droplets, and the pressure differential across the material. For a given material to be treated and also a given droplet size and composition, it is the level of the pressure differential which determines that the droplets form a coating. The level of pressure differential required for a given treatment may be determined experimentally by effecting several trial treatments, each at a different pressure differential. The pressure differentials which are effective for effecting the method of the invention are those at which there is no substantial difference in air permeance of the material before and after treatment, but nevertheless the properties of the material have been modified as desired.

By effecting such trials, it will be found that there will be a critical pressure differential above which the method of invention becomes operative. Below this critical pressure differential, the "particulate" material is captured within the pores by a mechanism described more fully in EP-A-0,272, 798. Thus at pressure differentials below the critical differential it will be found that the treated substrate has a substantially increased barrier performance compared to untreated material. However above the critical pressure differential, the barrier performance of the substrate is substantially the same as (and possibly worse than) that of the untreated substrate.

Therefore according to a second aspect of the present invention there is provided a method of treating a porous material to apply a surface coating within the pores, thereby to impart a desired property thereto, comprising establishing a pressure differential across the material and treating the higher pressure side with a suspension, dispersion, or aerosol of drops of a liquid comprising a treatment agent so that said droplets enter at least some of the pores, and wherein the pressure differential is sufficiently high that the air permeance of the treated material is not substantially changed relative to that of the untreated material.

For certain systems, it may be found that there is a visible change in opacity of treated samples of the substrate (as determined by holding the samples up to a light) above a particular pressure differential (which will in fact be the critical pressure differential). Thus for such systems, the change in opacity signals the critical pressure differential without the need to conduct tests of the substrate (e.g. to check air permeance). The change in opacity is accounted for by the fact that below the critical pressure differential the material is captured as particles, which scatter light, so that the opacity of the substrate is increased (as compared to untreated substrate). Above the critical pressure differential a coating is formed and the light scattering effect is removed, so that the opacity becomes similar to that of the untreated material.

Therefore according to a third aspect of the present invention there is provided a method of treating a porous material to impart a desired property thereto comprising establishing a pressure differential across the material and treating the higher pressure side with a suspension, dispersion, or aerosol of drops of a liquid comprising a treatment agent so that said droplets enter at least some of the pores; and wherein the material is one which below a particular threshold pressure differential displays an increase in opacity by treatment with said aerosol and wherein the method is effected using a pressure differential above said threshold differential.

The invention enables a wide variety of porous materials to be treated. For example, the porous material may be one which comprises pores of substantially uniform size or one which has a range of pore sizes. In the latter case, the material may be one in which the pores have differing sizes as described by a log-normal distribution in which a small fraction of the total number of pores (the so-called transport pores) are of a significantly greater size than the remaining pores. The porous material to be treated may be produced, for example, either by wet-laying or non wet-laying techniques. Preferably the material is a woven or non-woven material e.g. paper, textile, board or spun-bonded polymer. Particularly preferred materials to accumulation of substantially be treated by the method are those which comprise fibres which may be of natural or synthetic origin. For example, the fibres may be selected from cellulose, glass, polymer and mineral fibres. Alternatively, the fibres may be of synthetic plastics material. In such fibrous based materials, the pores are defined by the individual fibres on which the surface coating is formed.

The most suitable materials for treatment are those with pore sizes up to 500 μm.

A wide variety of liquids (for forming the coating) may be used in the method. It is for example possible to use a liquid which, after having formed the coating within the pores, is then subjected to a further treatment (e.g. curing by heat) to provide the desired finished coating within the material. Alternatively, the liquid may be one which remains in its "original" form (i.e. without chemical modification) as a coating for the pores in the material. A further possibility is for the liquid to act as a "carrier" for a solid material which may be present in the liquid as a dissolved solute or an insoluble solid. In this case, the liquid (containing the solid) will form a coating on the surface of the pores as previously, and the liquid may subsequently be evaporated to leave the solid as the coating on the pores. For example, a fire retardant material may be dissolved in a suitable solvent and applied to the interior of the material in this way.

Overall, the method of the invention may be used for applying a wide variety of treatments to porous materials. Non-limiting examples of the treatments which may be effected are to improve fire resistance (as mentioned above), enhance material strength, and modify contact angle (in terms of liquid or surfactant hold-out). A particular use of the method is for the treatment of water repellant materials with aqueous based liquids.

The method requires only a relatively small amount of the liquid to provide a coating which may provide (after further processing if necessary) significant modification in the properties of the original material. Typically, the coating form may comprise less than 1% by weight of the material, although higher amounts of coating may be used. For example, for some applications, the amount of the coating will be up to 20% of the material weight. Generally the coating material is selectively located within pores, so that little or none of it (e.g. less than 20% preferably less than 10%) forms an external surfact coating.

To effect the treatment of the material, the liquid is provided in the form of a suspension, dispersion or aerosol (preferably in air). This may be achieved by means of a nebuliser. Preferably, the droplet size (maximum diameter) will be less than 50 microns, more preferably less than 10 microns. Most suitably the droplet size is in the range of 0.5–10 μm. It is also preferred that the droplet size in the dispersion, suspension or aerosol is substantially uniform, e.g. such that at least 90% of the number distribution of sizes falls within a 3-fold size range. It will generally not be necessary to use extra solvents or wetting agents in conjunction with the liquid and, in fact, it will generally be preferred to avoid the use of wetting agents altogether.

To effect the coating method, a pressure differential is generated across the material and the dispersion, suspension or aerosol is applied to the higher pressure side. The pressure differential may be generated either by applying an increased pressure at that side of the web to which the dispersion, suspension or aerosol will be applied, or by providing a reduced (i.e. sub-atmospheric) pressure at the opposite side.

It is possible to use the method of the invention to apply successive (different) treatments to a particular material. The first treatment may be effected with particular liquid of a certain droplet size using a specific pressure differential. The second treatment may then be carried with a different liquid, in which case the droplet size and pressure differential conditions may be different from those used in the first treatment.

BRIEF DESCRIPTION OF DRAWINGS

FIG. 1 is a schematic view of apparatus for carrying out the method of the invention; and FIGS. 2, 3 and 4 are schematic sectional views through a treated web.

MODES FOR CARRYING OUT THE INVENTION

A suitable apparatus for effecting the treatment method is that disclosed in FIG. 1 and described in EP-A-0,272,798. It comprises a treatment chamber 1 in which a sample 2 of material to be treated is supported as shown. A flow control system 3 serves to establish a pressure differential across the material 2 whereas a Hudson nebuliser 4 associated with an air supply line 5 is provided at the other side. In use of the apparatus, an aerosol is generated in the nebuliser 4 and is drawn through the material 2 by virtue of the applied vacuum.

The following Examples are provided to illustrate the invention. All Examples were carried out using the apparatus illustrated in FIG. 1 working under the following conditions:

| | |
|---|---|
| Input pressure to nebuliser | 29 psi |
| Concentration of active agent in aerosol | 3 mg/dm$^3$ |
| Sample size of material | 78.5 cm$^2$ |

Example 1

A 60 gm$^{-2}$ paper (designated Paper A) of high permeance (about 25,000 Bendtsen) was treated with an aerosol of a suspension of ethylene vinyl acetate (EVA) in water, the suspension having the following composition:

| | |
|---|---|
| EVA | 33% (w/v) |
| Water | to 100% |

The method was carried out for varying times at a flow rate of 0.2 dm$^3$ min$^{-1}$ cm$^{-2}$ across the material using different samples of the material (cut from the same web) so as to give different extents of treatment. Table 1 lists the air permeance, maximum pore size and hydrostatic head (minimum pressure to cause liquid water penetration through the sample). It is immediately apparent from Table 1 that the impact of the treatment of Paper A by EVA is to reduce the hydrostatic head with little or no effect on air permeance or pore size.

This behaviour is explained by the conditions of treatment which are such that air dispersed droplets of EVA are captured on the fibres making up paper A from the air flow. However, the aerodynamic forces associated with the air flowing over the fibres causes captured droplets of EVA to flow and coat the fibre surfaces. Consequently, the principal effect of the treatment in Example 1 is to change the surface chemistry of the paper fibres, as evidenced by a decrease in hydrostatic head.

TABLE 1

Physical Properties of Paper A treated with agent EVA.

| Extent of Treatment (s) | Air Permeance (Bendtsen) | Max. Pore Size (μm) | Hydrostatic Head (mm H$_2$O) |
|---|---|---|---|
| 0 | 25,000 | 34 | 340 |
| 30 | 22,000 | 35 | 99 |
| 60 | 22,000 | 35 | 60 |

Example 2

This was generally a repeat of Example 1 but using a different active agent. In Example 2, Paper A was treated with an aerosol generated from an aqueous dispersion of ethylene-acrylic acid copolymer (EAA), the dispersion having the following composition.

| | |
|---|---|
| EAA | 20% (w/v) |
| Water | to 100% |

Table 2 lists the air permeance, maximum pore size and hydrostatic head of Paper A treated with EAA. Once again, the principal effect of the treatment is to change the surface chemistry of the paper fibres, in this case giving an increase in hydrostatic head.

TABLE 2

Physical Properties of Paper A treated with agent EAA

| Extent of Treatment (s) | Air Permeance (Bendtsen) | Max. Pore Size (μm) | Hydrostatic Head (mm H$_2$O) |
|---|---|---|---|
| 0 | 25,000 | 34 | 340 |
| 30 | 22,000 | 32 | 768 |
| 60 | 21,000 | 31 | 820 |

Example 3

Samples of a second 60 g m$^{-2}$ paper (designated Paper B) of low air permeance (nominally 200 Bendtsen) were each treated with an aerosol generated from an emulsion of alkylketene dimer at a flow rate across the paper of 4×10$^{-2}$ dm$^3$ min$^{-1}$ cm$^{-2}$. The emulsion had the following composition:

| | |
|---|---|
| Alkylketene dimer | 6% w/v |
| Water | to 100% |

Table 3 lists values of air permeance, maximum pore size and hydrostatic head of Paper B treated with alkylketene dimer. Again it is seen that the treatment results in a change in hydrostatic head with little effect on air permeance and pore size.

TABLE 3

Physical Properties of Paper B treated with agent alkylketene dimer.

| Extent of Treatment (s) | Air Permeance (Bendtsen) | Max. Pore Size (μm) | Hydrostatic Head (mm H$_2$O) |
|---|---|---|---|
| 0 | 180 | 25 | 760 |
| 30 | 160 | 25 | 951 |
| 60 | 155 | 24 | 1033 |

Example 4

A 50 g m$^{-2}$ web (designated Paper C) of low air permeance (around 500 Bendtsen) was treated with an aerosol of a suspension of Amguard CU (a phosphorus based fire retardant supplied by Albright and Wilson); the treatment flow rate across the sample was 0.25 dm$^3$ min$^{-1}$ cm$^{-2}$. The suspension of Amguard CU had the following composition:

| Amguard CU | 50% w/v |
|---|---|
| Water to | 100% |

Table 4 lists phosphorus content, air permeance and fire retardancy (as assessed by DIN 4102) of untreated and treated (30s) samples of Paper c.

TABLE 4

Physical Properties of Paper C treated with Amguard CU.

| Paper D | Phosphorus Content(%) | Air Permeance (Bendtsen) | Flame Retardancy (DIN 4102) |
|---|---|---|---|
| Untreated | 0 | 524 | Burns Completely |
| Treated | 0.9 | 450 | No Burn |

The treatment of Paper C with Amguard CU is seen to enhance greatly the flame retardancy properties of the web with little effect on air permeance.

Amguard CU is a liquid. Thus the particles in the aerosol are easily flowable/spreadable.

For the avoidance of doubt, it is declared that nothing disclosed in EP-A-0,272,798 is claimed herein. In particular the 'high inertia' comparative example included in Example 1 thereof (treatment of 60 g m$^{-2}$, 100 Bendtsen paper with an aerosol formed from a suspension of 50% w/v clay, 10% w/v latex adhesive, 0.5% w/v Calgon and the rest water, at a flow rate of 0.7 dm$^3$ min$^{-1}$ cm$^{-2}$) is not according to the present invention.

We claim:

1. A method of treating a porous material comprising establishing a pressure differential across the material and treating the higher pressure side with a suspension, dispersion or aerosol of droplets of a liquid so that said droplets enter at least some of the pores, wherein the treatment conditions are such that the aerodynamic forces within the pores exceed the surface tension forces maintaining integrity of the droplets which therefore spread to provide a surface coating within the pores.

2. A method as claimed in claim 1, wherein the pressure differential for the treatment is such that there is no substantial difference in air permeance of the material before and after treatment.

3. A method as claimed in claim 1 wherein the porous material is one which comprises pores of substantially uniform size.

4. A method as claimed in claims 1 wherein the porous material is one which has a range of pore sizes.

5. A method as claimed in claim 4, wherein the pores have differing sizes as described by a log-normal distribution in which a small fraction of the total number of pores are of a significantly greater size than the remaining pores.

6. A method as claimed in claim 1, wherein the porous material is produced by a wet-laying technique.

7. A method as claimed in claims 1, wherein the porous material is produced by a non wet-laying techniques.

8. A method as claimed in claims 1, wherein the porous material is paper, textile, board or spun-bonded polymer.

9. A method as claimed in claim 1, wherein the material to be treated comprise fibres of natural or synthetic origin.

10. A method as claimed in claim 9, wherein the fibres are selected from cellulose, glass, polymer and mineral fibres.

11. A method as claimed in claim 9, wherein the fibres are of synthetic plastics material.

12. A method as claimed in any preceding claim 1 wherein the material has pore sizes up to 500 μm.

13. A method as claimed in claim 1, wherein the suspension, dispersion or aerosol of the liquid is produced by a nebuliser.

14. A method as claimed in claim 1, wherein the droplet size of the liquid is less than 50 μm.

15. A method as claimed in claim 14, wherein the droplet size is less than 10 μm.

16. A method as claimed in claim 15, wherein the droplet size is in the range 0.5–10 μm.

17. A method as claimed in claim 1, wherein the droplet size of the liquid is substantially uniform.

18. A method as claimed in claim 1, wherein the liquid is subjected to a further treatment after having formed the coating to provide the desired finished coating within the material.

19. A method as claimed in claim 18, wherein the further treatment is curing by heat.

20. A method as claimed in claim 1, wherein the liquid remains without further modification as a coating for the pores in the material.

21. A method as claimed in claims 1, wherein the liquid acts as a carrier for a treatment material.

22. A method as claimed in claim 21, wherein the treatment material is present in the liquid as a dissolved solute.

23. A method as claimed in claim 21, wherein the treatment material is present in the liquid as an insoluble solid.

24. A method as claimed in claim 22, wherein the carrier liquid is evaporated after having formed a coating on the surface of the pores to leave the treatment material as the coating on the pores.

25. A method as claimed in claims 21, wherein the treatment material is a fire retardant material.

26. A method according to any preceding claim 1 including a preliminary step of treating samples of the porous material with the suspension, dispersion or aerosol of droplets under a range of treatment conditions thereby determining a threshold which must be exceeded to achieve treatment according to any preceding claim; the subsequent treatment of the material being carried out under conditions exceeding said threshold.

27. A method according to claim 26 wherein said range of treatment conditions is a range differing in pressure differential, whereby a threshold value of pressure differential is established.

28. A method according to claim 26 wherein said threshold is established by determining air permeance of treated samples.

29. A method according to claim 26 wherein said threshold is established by monitoring the opacity of treated samples.

30. A method of treating a porous material to apply a surface coating within the pores, thereby to impart a desired property thereto comprising establishing a pressure differential across the material and treating the higher pressure side with a suspension, dispersion or aerosol of droplets of a liquid comprising a treatment agent so that said droplets enter at least some of the pores wherein the pressure differential is sufficiently high that the air permeance of the treated material is not substantially changed relative to that of the untreated material.

31. A method of treating a porous material to impart a desired property thereto comprising establishing a pressure differential across the material and treating the higher pressure side with a suspension, dispersion or aerosol of droplets of a liquid comprising a treatment agent so that said droplets enter at least some of the pores wherein the material is one which below a particular threshold pressure differential displays an increase in opacity by treatment with said aerosol and wherein the method is effected using a pressure differential above said threshold differential.

32. A porous material having a surface coating located selectively within the pores, as producible by a method comprising establishing a pressure differential across the material and treating the higher pressure side with a suspension, dispersion or aerosol of droplets of a liquid so that said droplets enter at least some of the pores, wherein the treatment conditions are such that the aerodynamic forces within the pores exceed the surface tension forces maintaining integrity of the droplets which therefore spread to provide a surface coating within the pores.

* * * * *